(12) United States Patent
Sedarat

(10) Patent No.: US 12,081,373 B1
(45) Date of Patent: Sep. 3, 2024

(54) DECISION FEEDBACK EQUALIZATION FOR ELECTRO-MAGNETIC INTERFERENCE CANCELLATION IN RECEIVED SIGNAL

(71) Applicant: Ethernovia Inc., San Jose, CA (US)

(72) Inventor: Hossein Sedarat, San Jose, CA (US)

(73) Assignee: Ethernovia Inc., San Jose, CA (US)

( * ) Notice: Subject to any disclaimer, the term of this patent is extended or adjusted under 35 U.S.C. 154(b) by 45 days.

(21) Appl. No.: 18/059,511

(22) Filed: Nov. 29, 2022

Related U.S. Application Data

(60) Provisional application No. 63/264,628, filed on Nov. 29, 2021.

(51) Int. Cl.
*H04L 25/03* (2006.01)
*H04L 25/49* (2006.01)

(52) U.S. Cl.
CPC .. *H04L 25/03063* (2013.01); *H04L 25/03267* (2013.01); *H04L 25/03968* (2013.01); *H04L 25/4917* (2013.01)

(58) Field of Classification Search
CPC ......... H04L 25/03006; H04L 25/03057; H04L 25/03063; H04L 25/03267; H04L 25/0328; H04L 25/03878; H04L 25/03885; H04L 25/03891; H04L 25/03968; H04L 2025/03509; H04L 2025/03636
USPC .......... 375/232–235, 346, 350; 708/322, 323
See application file for complete search history.

(56) References Cited

U.S. PATENT DOCUMENTS

| | | | | |
|---|---|---|---|---|
| 10,594,524 | B1 * | 3/2020 | Sedarat | H04L 25/03343 |
| 11,522,735 | B1 * | 12/2022 | Zheng | H04L 25/03885 |
| 2015/0215138 | A1 * | 7/2015 | Dorman | H04L 25/03076 375/233 |
| 2023/0054834 | A1 * | 2/2023 | Manjunath | H04L 25/4917 |

* cited by examiner

*Primary Examiner* — Young T. Tse
(74) *Attorney, Agent, or Firm* — Schwegman Lundberg & Woessner, P.A.

(57) ABSTRACT

Various embodiments described herein provide for data communications using decision feedback equalization (DFE) for electro-magnetic interference (EMI) cancellation in a received signal, such as a signal received over a data communication medium and at a receiver of a communication system. In particular, some embodiments use a DFE and a feed-forward equalizer (FFE) to equalize a signal received by a first physical layer device from a second physical layer device over a data communication medium, and to operate as a narrowband notch filter to cancel EMI from the received signal.

18 Claims, 7 Drawing Sheets

DECISION FEEDBACK EQUALIZATION FOR ELECTRO-MAGNETIC INTERFERENCE CANCELLATION IN RECEIVED SIGNAL

CROSS-REFERENCE TO RELATED APPLICATION

This application claims priority to and the benefit of U.S. Provisional Patent Application No. 63/264,628, filed on Nov. 29, 2021, which is incorporated herein by reference.

TECHNICAL FIELD

Embodiments described herein relate to data communications and, more particularly, to systems, methods, devices, and instructions for data communications using decision feedback equalization (DFE) for electro-magnetic interference (EMI) cancellation in a received signal, such as a signal received over a data communication medium and at a receiver of a communication system.

BACKGROUND

Within digital communications systems, analog data signals are typically transmitted from a transmitter to a receiver through a suitable data communication medium (also referred to herein as a data transmission medium or a signal transmission medium) that links the transmitter to the receiver, often referred to as a communication channel (hereafter referred to as "channel"). Generally, the physical layer (PHY) of a data communications interface (e.g., data network interface) of a computing device is responsible for transmitting data bits over the channel and, as such, comprise a transmitter, a receiver, or both compatible the channel. Channels vary and can include, for example, wired or wireless channels. For instance, a channel can comprise a cable with multiple twisted pairs (e.g., Category 5 (CAT 5) cable or a Category 6 (CAT 6) cable) or a cable with a single twisted pair. Channel type and the physical environment can determine the presence and severity of various channel effects (e.g., interference, attenuation, and delay) with respect to a given channel, which can have detrimental effects on an analog data signal transmitted over the given channel by the time the transmitted analog data signal reaches the receiver. Usually, the PHY layer of a communications interface compatible with a given channel can compensate for channel effects and achieve a certain level of data rate/speed (e.g., 10 Mbps, 100 Mbps, 1 Gbps, 10 Gbps, or 100 Gbps) by using different types of encoding or signal modulation schemes for transmitting data over the given channel and noise. In order to guarantee interoperability among various transceivers, the transmit specifications are typically defined by standard bodies such as the Institute of Electrical and Electronics Engineers (IEEE). An example IEEE standard includes the IEEE 802.3 standards, which standardizes the physical layers of various Ethernet protocols. Among other things, the standard may specify the transmit signal modulation, transmit filtering and precoding. The modulation may be a pulse amplitude modulation (PAM) scheme (e.g., PAM-2, PAM-3, PAM-4), and transmit filtering and precoding may be linear or nonlinear. For example, during a training mode, the modulation can comprise PAM-2 and, during data mode, the modulation can comprise PAM-4 (e.g., multi-gig network system based on IEEE 802.3ch) or PAM-3 (e.g., one-gig network system based on IEEE 802.3 bp).

With respect to a given channel, channel effects can distort (e.g., cause amplitude or phase distortion) analog signal transmitted by a transmitter (e.g., of a PHY), which in turn can result in inter-symbol interference (ISI) in the transmitted analog data signal received by the receiver (e.g., of a PHY). A pulse or other symbol in a transmitted analog data signal, representing the logic state of one data bit at a cursor, can be effectively distorted by ISI. ISI can comprise a pre-cursor component (pre-cursor ISI) that distorts a transmitted analog data signal with respect to one or more data bits preceding a bit corresponding to a cursor of the transmitted analog data signal, and a post-cursor component (post-cursor ISI) that distorts the transmitted analog data signal with respect to one or more data bits succeeding a bit corresponding to a cursor of the transmitted analog data signal.

Additionally, network-based communication, such as that based on Ethernet physical layer standards, often has to deal with noise or interference due to various sources in an environment. An example of this is electromagnetic interference (EMI) from radio frequency (RF) sources, which is particularly problematic for network-based communication in automotive environments. Unlike other sources of interference, such as thermal noise, nonlinearities, impulse noise, and alien crosstalk, EMI spectrum is a narrowband interference (NBI) in frequency domain. NBI can be in-band (e.g., below Nyquist frequency) or out-of-band (e.g., above Nyquist frequency) with the signal being transmitted from a transmitter to a receiver.

Traditionally, a receiver can implement decision feedback equalization (DFE) to correct for post-cursor ISI in the signal received at the receiver, and can include a linear equalizer to correct for pre-cursor ISI in a received analog data signal. A conventional DFE comprises a feedback loop which uses decisions from a slicer to eliminate the post-cursors in ISI. However, while DFE provides effective equalization, it typically suffers from error propagation where a wrong detected symbol at receiver (e.g., at the slicer) is fed back through a DFE (e.g., fed back to the input of the slicer), which increases the probability of more error symbols (e.g., higher chance of error in future slicer decisions). This results in a single error propagating to multiple error symbols, which manifests as bursts of error. Furthermore, the stronger the DFE coefficients (e.g., tap coefficients) or the longer the DFE (e.g., the more taps), the more the DFE amplifies this spreading effect, which results in longer error bursts and higher chances of error propagation.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
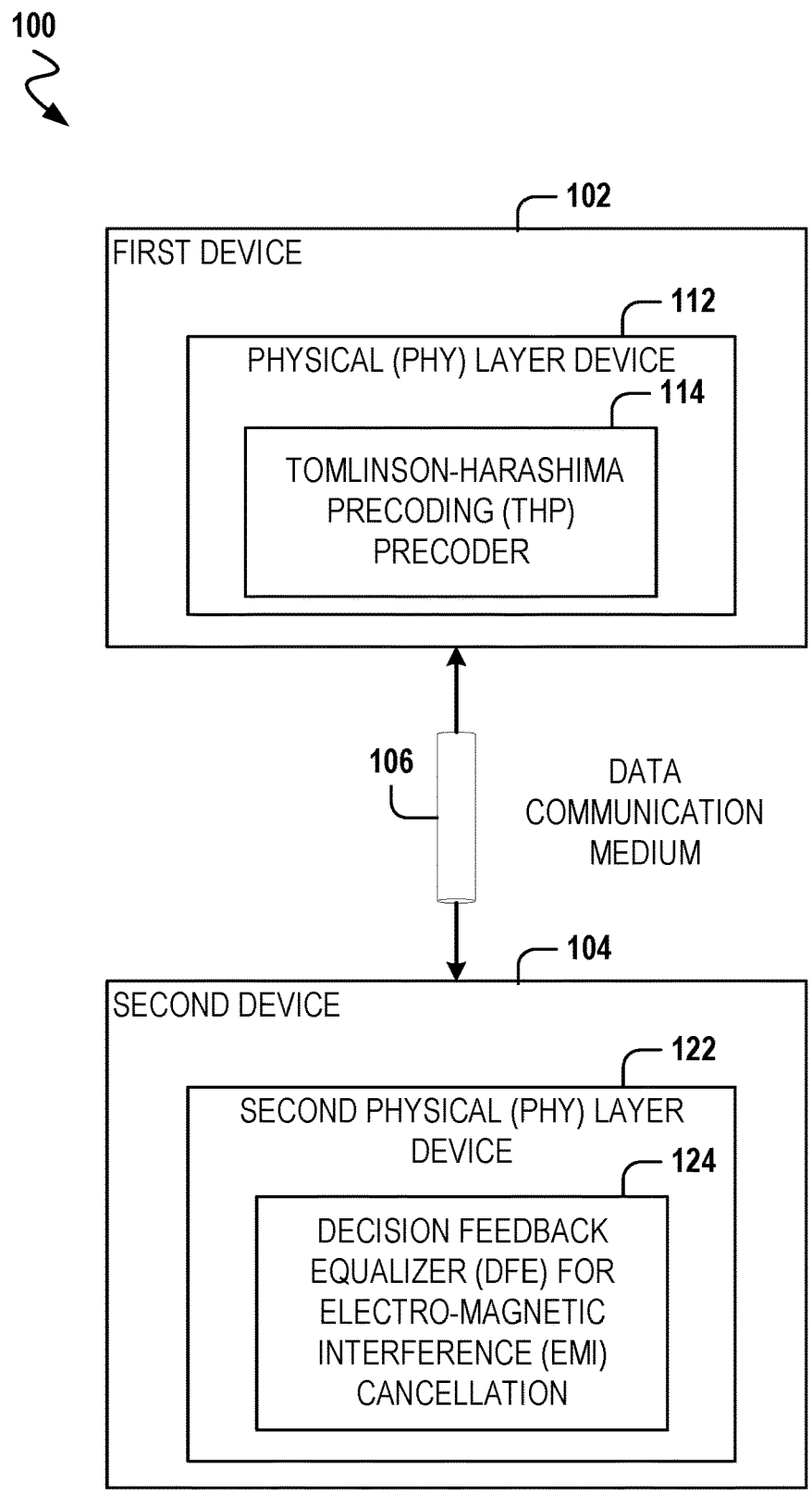
FIG. 1 is a block diagram illustrating an example system that comprises physical (PHY) layer devices, any of which can use decision feedback equalization (DFE) to cancel electro-magnetic interference (EMI) in a received signal, in accordance with some embodiments.

Various embodiments described herein provide for data communications using decision feedback equalization (DFE) for electro-magnetic interference cancellation (EMI) in a received signal, such as a signal received over a data communication medium and at a receiver of a communication system. In particular, some embodiments described herein use a DFE and a feed-forward equalizer (FFE) to equalize a signal received by a first physical layer device from a second physical layer device over a data communication medium, and to operate as a narrowband notch filter to cancel (e.g., compensate for or attenuate) EMI from the received signal. By using various embodiments described herein, physical layer (or physical layer device) for networking applications, such as automotive networking applications and the like, can implement EMI cancellation with respect to a signal received at a receiver (e.g., a receiving PHY) from a transmitter (e.g., a transmitting PHY).

For some embodiments, a FFE is used to generate (e.g., create) a notch at a frequency corresponding to the EMI, while the DFE compensates for this notch by generating (e.g., creating) a peak at that the frequency. Additionally, the longer the FFE and DFE, the deeper and narrower the notch and the more effective EMI cancellation by an embodiment. The more the number of taps and/or the larger the magnitude of the taps (e.g., the larger the tap coefficient values) the DFE has (e.g., the longer the DFE), the better the DFE of an embodiment can cancel (e.g., compensate for or attenuate) EMI in a received signal, and the better the chances an embodiment can reach a target signal-to-noise ratio (SNR) at a receiver. Generally, the more the number of DFE taps (e.g., 16 taps) and/or the larger the magnitude of the DFE taps, the more complex the implementation of the DFE, the more power usage by the DFE, and the higher the error propagation through the DFE. Accordingly, depending on the embodiment, the number of taps of the DFE (e.g., length of the DFE filter) is a design choice and can be determined based on a balance (e.g., tradeoff) between a) equalization power and EMI cancellation power and b) implementation complexity and severity of error propagation.

As used herein, a DFE's "length" corresponds to a number of taps the DFE has, and a DFE is considered to be "longer" with the addition of taps (e.g., the "longer" the DFE, the more taps the DFE has). Likewise, a FFE's "length" corresponds to a number of taps the FFE has, and a FFE is considered to be "longer" with the addition of taps (e.g., the "longer" the FFE, the more taps the FFE has).

As used herein, a FFE can generate (e.g., create) a number of delayed versions of an input signal received by the FFE, where the delayed versions can be added back to the input signal with a corresponding weight (e.g., tap coefficients). The delay can be 1 unit interval (UI) in duration. Depending on the embodiment, implementation of a FFE can comprise with multiple-tap filters and multiple tap coefficients, and taps of those filters can be either pre-cursor, post-cursor, or both. A tap coefficient can be positive or negative depending on whether the tap coefficient corresponds to a pre-cursor or post-cursor.

For some embodiments, one or more methodologies are used to mitigate error propagation with respect to DFE, thereby enabling use of the DFE for cancelling (e.g., compensating for or attenuating) EMI from a received signal.

For example, an embodiment can use a fractionally-spaced equalizer (FSE) with the DFE, which can eliminate the dependency of taps of the DFE on a sampling phase. For instance, the use of fractionally-space equalization by some embodiments can permit smaller coefficients (e.g., coefficient values) for the taps of the DFE, especially where the data communication medium (e.g., between two PHY devices) comprises shorter wires or cables. As another example, an embodiment can use Tomlinson-Harashima precoding (THP), such as partial-THP, with the DFE, where THP can reduce the magnitude of the tap coefficients (e.g., coefficient values). For instance, the use of partial-THP by some embodiments can be beneficial where the data communication medium (e.g., between two PHY devices) comprises longer wires or cables. For some embodiments, THP or partial-THP is implemented in accordance with a methodology described by U.S. Pat. No. 10,594,524, which is incorporated herein by reference in its entirety. As another example, an embodiment can use a filter optimization engine (FOE) for determining one or more coefficients for taps of the DFE (e.g., based on a least mean square (LMS) algorithm or a minimum mean square error (MMSE) algorithm), which can reduce the magnitude of the tap coefficients (e.g., coefficient values) and which can do so with low penalty to SNR. For instance, a FOE can implement a MMSE or a LMS leakage mechanism for determining one or more coefficients for taps of the DFE to mitigate error propagation.

For various embodiments, Tomlinson-Harashima precoding (THP) and other types of precoding is used to pre-compensate for channel effects by using signal equalization on a transmitter side (e.g., transmitting PHY device) prior to the transmitter transmitting an analog signal to a receiver. THP can implement equalization while not suffering from error propagation as the transmit symbols are readily available for the transmitter and the THP and, hence, there is no detection error. Additionally, THP can increase the effective resolution of the symbol in the transmit data path. While the input to THP may take a finite number of discrete values of PAM levels, the output of the THP can take any possible value within the output range.

By using various embodiments, physical layers for networking applications, such as automotive networking applications and the like, can implement EMI cancellation with respect to a signal received at a receiver (e.g., a receiving PHY) from a transmitter (e.g., a transmitting PHY).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 that comprises a first physical (PHY) layer device 112 and a second physical (PHY) layer device 122, either of which can use DFE as described herein to cancel (e.g., compensate for or attenuate) EMI in a received signal (e.g., received data signal), in accordance with some embodiments. As shown, the first physical layer device 112 is part of a first device 102, and the second physical layer device 122 is part of a second device 104. The first physical layer device 112 represents one or more components of the first device 102 that implement or enable a PHY layer of a network stack of the first device 102, while the second physical layer device 122 represents one or more components of the second device 104 that implement or enable a PHY layer of a network stack of the second device 104. A data communication medium 106 operatively couples the first device 102 to the second device 104, where the data communication medium 106 can support a data link between the first device 102 and the second device 104. The data communication medium 106 can comprise a wire (e.g., a twisted pair) that permits transmission of an analog signal. For some embodiments, the first physical layer device 112 and the second physical layer device 122 support IEEE 802.3 data communications (e.g., 10GBASE-T1) therebetween. Additionally, data communication between the first physical layer device 112 and the second physical layer device 122 may use PAM-4, PAM-3, or some other form of modulation in generating the analog data signal that is transmitted from the first physical layer device 112 to the second physical layer device 122. Depending on the network application, different types of data payload can be transmitted from one physical layer device to another physical layer device over the data communication medium 106. For instance, within an automotive network application, received data payload (e.g., within a data frame) can carry video data or sensor data for a vehicle.

Figure 7:
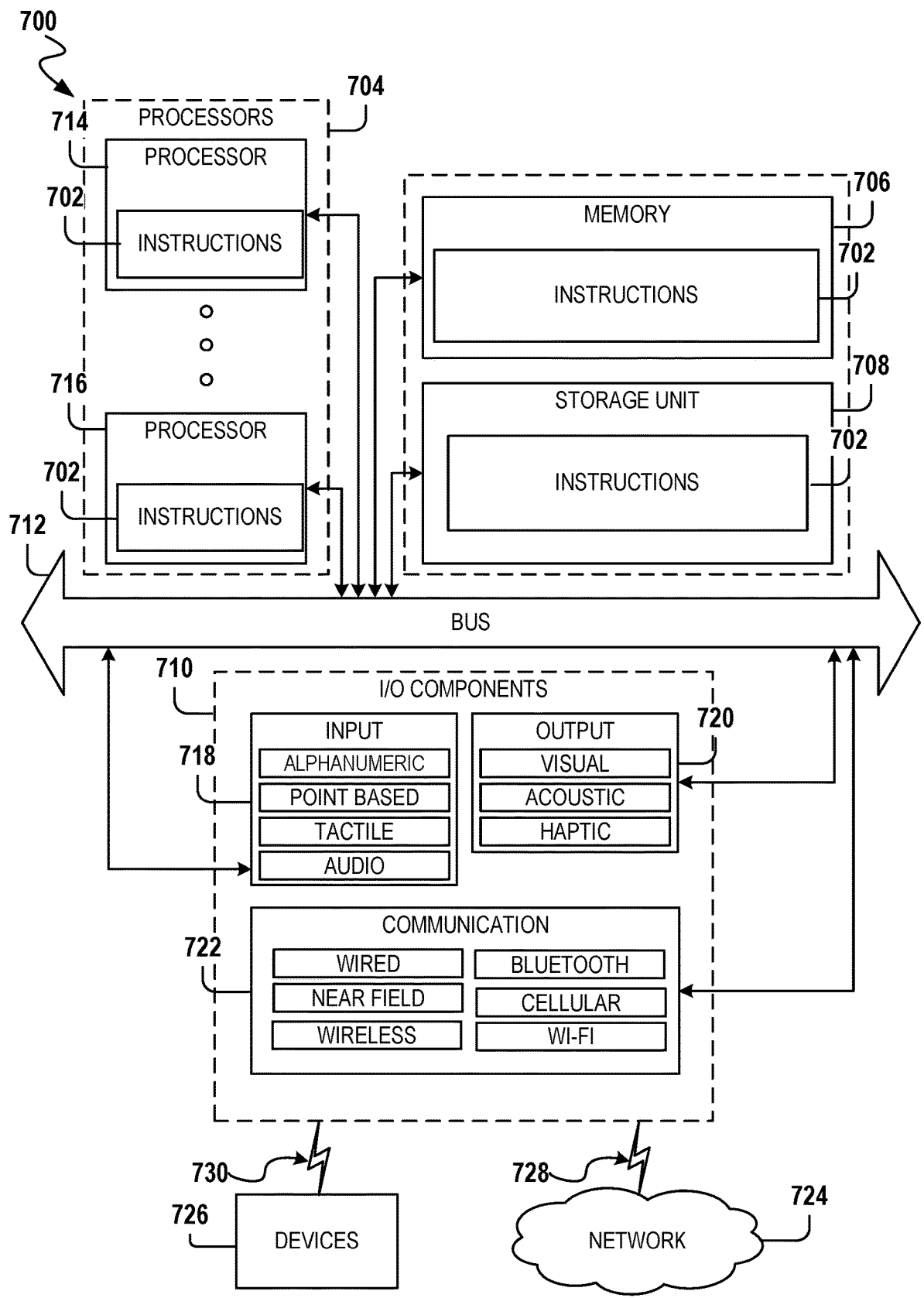
FIG. 7 is a block diagram illustrating components of an example machine that can use one or more embodiments discussed herein.

Depending on the embodiment, the first device 102 can be implemented (at least in part) by machine 700 of FIG. 7, and the second device 104 can be implemented (at least in part) by machine 700 of FIG. 7. As shown, the first physical layer device 112 comprises a Tomlinson-Harashima precoding (THP) precoder 114 (hereafter, the THP precoder 114) in accordance with various embodiments. For some embodiments, a standard nonlinear precoder of the first physical layer device 112 is repurposed as the THP precoder 114. The second physical layer device 122 comprises a decision feedback equalizer (DFE) for electro-magnetic interference (EMI) cancellation 124 (hereafter, the DFE 124) in accordance with various embodiments. The first physical layer device 112 can implement one or more of the methods for THP as described herein, and the second physical layer device 122 can implement one or more methods of EMI cancellation using a DFE as described herein.

The THP precoder 114 implements THP at the first physical layer device 112 when the first physical layer device 112 operates as a transmitter. In accordance with various embodiments, the THP precoder 114 enables the first physical layer device 112 to implement partial equalization of a data signal prior to the data signal being transmitted from the first device 102 to the second device 104 over the data communication medium 106. In doing so, the THP precoder 114 can assist the first physical layer device 112 in pre-compensating for inter-symbol interference (ISI) that may be introduced into the data signal as it is transmitted over the data communication medium 106. Depending on the embodiment, the THP precoder 114 may be enabled at the first physical layer device 112 based on a request received from the second device 104 (e.g., a request sent during a PHY training or negotiation phase between the first device 102 and the second device 104). For some embodiments, the THP precoder 114 comprises one or more integer taps (e.g., all integer taps). Depending on the embodiment, each of those one or more integer taps can have a coefficient of least one 1 or -1. For example, the THP precoder 114 may comprise a single unity-tap.

In accordance with various embodiments, the DFE 124 implements EMI cancellation at the second physical layer device 104, which assists the second device 104 in cancelling (e.g., compensating for or attenuating) EMI present in a data signal received from the second device 102 over the data communication medium 106. For some embodiments, the DFE 124 comprises a FFE and a DFE, where the FFE is configured to generate (e.g., create) a notch in the data signal at a frequency corresponding to the EMI, and the DFE is configured to compensate for this notch in the data signal by generating (e.g., creating) a peak at that the frequency. According to some embodiments, the DFE 124 comprises a fractionally-spaced equalizer (FSE), which can help mitigate error propagation in the DFE by eliminating the dependency of taps of the DFE on a sampling phase. For some embodiments, the DFE 124 comprises a data slicer configured to handle THP or partial-THP included in the data signal by the first physical layer device 112 (via the THP precoder 114), where the THP or partial-THP can help mitigate error propagation in the DFE. Further, for some embodiments, the DFE 124 comprises a FOE for determining one or more coefficients for taps of the DFE using an algorithm, such as a LMS algorithm or a MMSE algorithm, which help mitigate error propagation in the DFE. Example architectures for the DFE 124 are described and illustrated with respect to FIGS. 2 through 5.

Though not illustrated, in certain applications, the first device 102 can be communicatively coupled to one or more other devices (e.g., one or more sensor devices) that generate or otherwise provide the first device 102 with data (e.g., data packets or data frames) that need to be transmitted to the second device 104. Accordingly, via the first physical layer device 112, the first device 102 can transmit the data received from the one or more other devices to the second device 104 (e.g., using a high data rate, such as one based on IEEE 1202.11ch). Depending on the embodiment, the one or more devices can comprise one or more sensors or other peripheral devices that generate or provide video data or radar/lidar data according to a data standard. The second physical layer device 122 of the second device 104 can receive the data from the first device 102. Subsequently, the data received at the second device 104 can be processed by a processor that is part of, or operatively coupled to, the second device 104. For example, the received data can comprise video data from a camera sensor device that can be processed at the second device 104. The processor of the second device 104 can include, without limitation, an electronic control unit (ECU), a central processing unit (CPU), or a graphic processing unit (GPU).

FIGS. 2 through 5 are block diagrams illustrates example architectures for a decision feedback equalizer for EMI cancellation in accordance with some embodiments, which can be implemented in a physical (PHY) layer device. Depending on the embodiment, any one of the example architectures can implement at least a part of the first physical layer device 112, the second physical layer device 122, or both.

Figure 2:
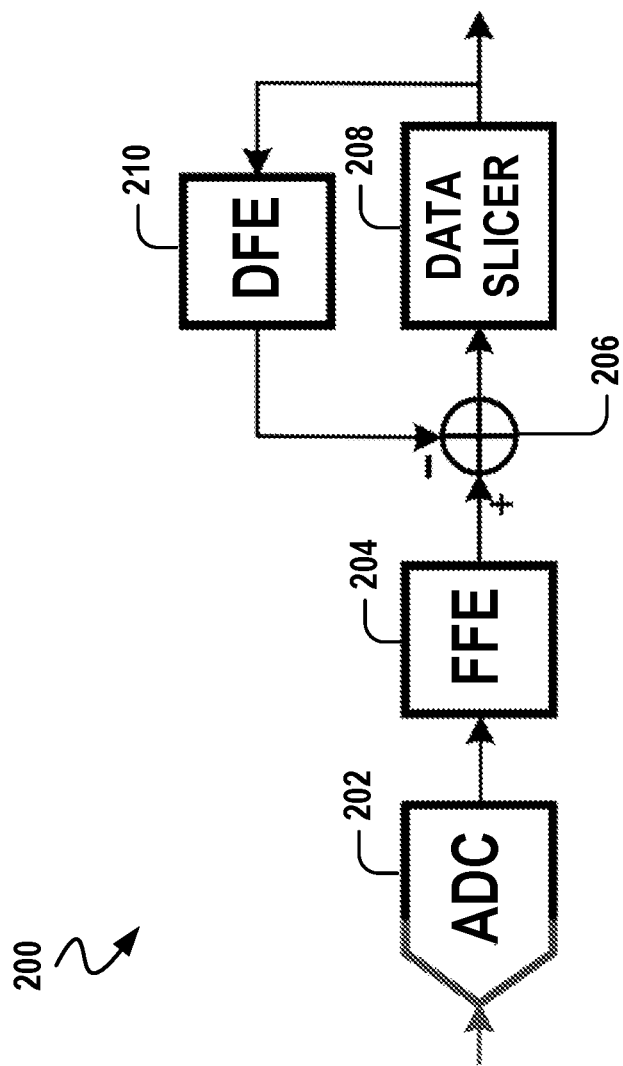
FIGS. 2 through 5 are block diagrams illustrates example architectures for a decision feedback equalizer for EMI cancellation in accordance with some embodiments.

Referring now to FIG. 2, an example architecture 200 for a decision feedback equalizer (DFE) 210 is illustrated. As shown, the architecture 200 comprises an analog-to-digital converter (ADC) 202, a feed-forward equalizer (FFE) 204, a combiner 206, a data slicer 208, and the DFE 210. An output of the ADC 202 is operatively coupled to an input of the FFE 204, an output of the FFE 204 is operatively coupled to a first input (e.g., a positive input) of the combiner 206, an output of the combiner 206 is operatively coupled to an input of the data slicer 208, an output of the data slicer 208 is operatively coupled to an input of the DFE 210, and an output of the DFE 210 is operatively coupled to a second input (e.g., a negative input) of the combiner 206.

The ADC 202 is configured to receive an input analog signal, which represents or is otherwise based on a data signal (e.g., analog data signal) transmitted from a first physical layer device (e.g., 112) to a second physical layer device (e.g., 122) over a data communication medium (e.g., 106). For some embodiments, the ADC 202 generates a digital signal based on the input analog signal (e.g., converts the input analog signal to the digital signal). Additionally, for some embodiments, the ADC 202 is configured to sample the input analog signal at a baud rate.

The FFE 204 receives the digital signal from the ADC 202 and generates a first equalized signal (e.g., feed-forward equalized signal) based on the digital signal. For some embodiments, the FFE 204 generates (e.g., creates) a notch in the digital signal at a frequency corresponding to the EMI to be cancelled, and the first equalized signal represents the digital signal with the notch.

The combiner 206 receives the first equalized signal from the FFE 204, receives the second equalized signal from the DFE 210, and combines the first equalized signal and the second equalized signal to generate a narrowband-cancelled signal. For some embodiments, the combiner 206 combines the first and the second equalized signals by canceling, removing, or subtracting the second equalized signal from the first equalized signal. For various embodiments, the narrowband-cancelled signal represents the digital signal after electro-magnetic interference cancellation.

The data slicer 208 receives the narrowband-cancelled signal from the combiner 206 and generates a sample signal by sampling the narrowband-cancelled signal. For some embodiments, the data slicer 208 samples the narrowband-cancelled signal based on a pulse amplitude modulation (PAM). For instance, the PAM used by the data slicer 208 can be PAM-4 or PAM-7. Depending on the embodiment, the data slicer 208 can comprise a saturating data slicer or a wrapping data slicer. For example, the data slicer 208 can comprise a PAM-4 saturating data slicer or a PAM-7 wrapping data slicer. As used herein, a saturating data slicer can comprise a data slicer that clips at the highest and lowest levels of the data slicer (e.g., where the nominal levels are +/−1, +/−3, level 2.5 can be rounded up 3). A wrapping data slicer can comprise a data slicer that wraps back to the lowest level when the data slicer input is above the highest level (e.g., where the nominal levels are +/−1, +/−3, level 3.6 can be to the minimal level). According to some embodiments, a wrapping data slicer comprises a wrap component (e.g., constructed as a digital modulo operation) that operates to map the points on an expanded constellation to original constellation points, which can enable the architecture 200 to be compatible with THP implemented by the transmitting physical layer device (e.g., 112). For some embodiments, where the data signal transmitted by a transmitting physical layer device (e.g., 112) include THP or partial-THP, the data slicer 208 comprises a wrapping data slicer (e.g., PAM-7 wrapping data slicer) to handle the THP/partial-THP. For various embodiments, where the data signal transmitted by a transmitting physical layer device does not include THP or partial-THP, the data slicer 208 comprises a saturating data slicer (e.g., PAM-4 saturating data slicer).

The DFE 210 receives the sample signal from the data slicer 208 and generates a second equalized signal based on the sample signal. For some embodiments, the DFE 210 comprises a set of taps, each of which can receive a coefficient value (e.g., weight) that can affect the second equalized signal generated by the DFE 210. Depending on the embodiment, the number of taps included by the DFE 210 can be a design choice. According to some embodiments, the number of taps included by the DFE 210 is sufficient for the DFE 210 to generate a decision feedback equalized signal (e.g., the second equalized signal) that can cancel, remove, subtract, or compensate for EMI present in the feed-forward equalized signal (e.g., the first equalized signal) generated by the FFE 204. For instance, the DFE 210 of an embodiment can include sixteen taps with corresponding coefficients.

Figure 3:
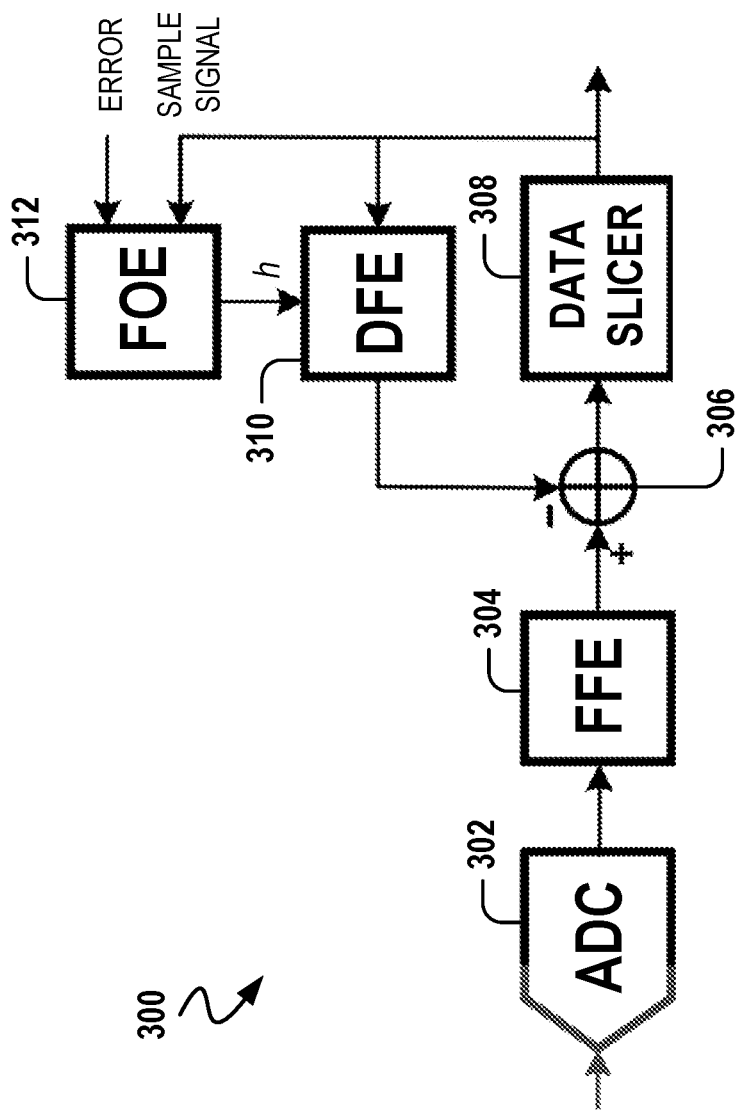

Referring now to FIG. 3, an example architecture 300 for a decision feedback equalizer (DFE) 310 with a filter optimization engine (FOE) 312 is illustrated. As shown, the architecture 300 comprises an analog-to-digital converter (ADC) 302, a feed-forward equalizer (FFE) 304, a combiner 306, a data slicer 308, the DFE 310, and the FOE 312. According to some embodiments, the ADC 302, the FFE 304, the combiner 306, the data slicer 308, and the DFE 210 are respectively similar to the ADC 202, the FFE 204, the combiner 206, the data slicer 208, and the DFE 210 illustrated and described with respect to FIG. 2. As shown, the output of the data slicer 308 is operatively coupled to an input of the FOE 312. For some embodiments, the FOE 312 is configured to receive an error signal (e.g., receiver detection error signal), receive the sample signal from the data slicer 308, and generate one or more coefficients for one or more corresponding taps of the DFE 310. For various embodiments, the error signal comprises the difference between the signal at the input of the data slicer 308 and the expected transmit signal, where the expected transmit signal can comprise a known training signal (e.g., signal derived from a linear feedback shift register (LFSR)) or the signal at the output of the data slicer 308. The FOE 312 can assist in mitigating error propagation in the DFE 310 by determining one or more optimal coefficients for one or more taps of the DFE 310 based the sample signal and the receiver detection error signal. For various embodiments, the FOE 312 generates the one or more coefficients by determining (e.g., identifies, finds) the one or more coefficients using a minimum mean square error (MMSE) methodology (e.g., algorithm, such as a MMSE leakage algorithm) or least mean square (LMS) methodology (e.g., algorithm, such as a LMS leakage algorithm). For example, the FOE 312 can use a following coefficient update equation to implement a LMS leakage methodology for determining a coefficient for a tap of the DFE 310:

$$h_{i+1} = h_i + \mu ex - \alpha h_i,$$

where h is the coefficient, e is the error signal (e.g., receiver detection error signal), x is the input signal (e.g., the sample signal), $\mu$ is the adaptation step size (e.g., y is a value in the order of 0.001, or in the form of $1/(2^n)$), and $\alpha$ is the leakage factor (e.g., $\alpha$ is a value in the order of 0.001 of $\mu$, or in the form of $1/(2^n)$). One or more values for h, $\mu$, and $\alpha$ can be determined based on a design or implementation choice.

By using a leakage algorithm (e.g., a MMSE or a LMS leakage algorithm), an embodiment can optimize coefficient values using an approach that attempts to maximize SNR while minimizing magnitudes of coefficients of taps of the DFE 310. The one or more coefficients determined by the FOE 312 can enable the DFE 310 to handle ISI while keeping coefficient magnitudes lower, which can help in mitigating error propagation in the DFE 310.

Figure 4:
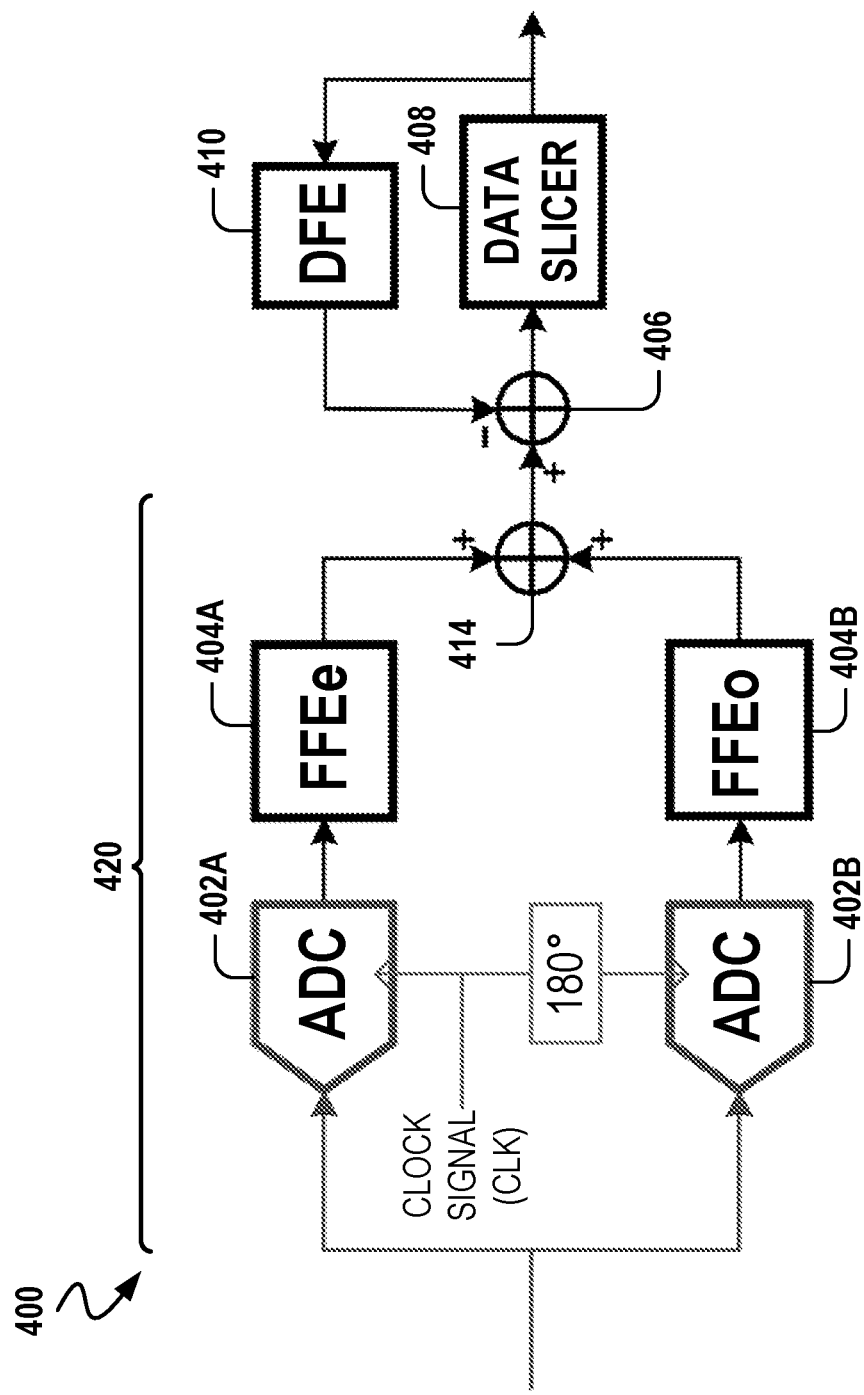

Referring now to FIG. 4, an example architecture 400 for a decision feedback equalizer (DFE) 410 with a fractionally-spaced equalizer (FSE) 420 is illustrated. As shown, the architecture 400 comprises the FSE 420, a combiner 406, a data slicer 408, and the DFE 410. According to some embodiments, the combiner 406, the data slicer 408, and the DFE 410 are respectively similar to the combiner 206, the data slicer 208, and the DFE 210 illustrated and described with respect to FIG. 2. An output of the FSE 420 is operatively coupled to a first input (e.g., a positive input) of the combiner 406, an output of the combiner 406 is operatively coupled to an input of the data slicer 408, an output of the data slicer 408 is operatively coupled to an input of the DFE 410, and an output of the DFE 410 is operatively coupled to a second input (e.g., a negative input) of the combiner 406.

The FSE 420 is configured to receive an input analog signal, which represents or is otherwise based on a data signal (e.g., analog data signal) transmitted from a first physical layer device (e.g., 112) to a second physical layer device (e.g., 122) over a data communication medium (e.g., 106). For some embodiments, the FSE 420 generates a first equalized signal (e.g., factionally-spaced equalized signal) based on the input analog signal (e.g., converts the input analog signal to the first equalized signal). Additionally, for some embodiments, the FSE 420 is configured to sample the input analog signal at a higher rate than the ADC 202 of FIG. 2 or the ADC 302 of FIG. 3. For instance, the FSE 420 of an embodiment can sample the input analog signal at twice the rate of baud rate (e.g., sample at odd and even phases).

As shown, the FSE 420 comprises an analog-to-digital converter (ADC) 402A, an analog-to-digital converter (ADC) 402B, a feed-forward equalizer (FFEe) 404A, a feed-forward equalizer (FFEo) 404B, and a combiner 414. As shown, an output of the ADC 402A is operatively coupled to an input of the FFEe 404A, an output of the FFEe 404A is operatively coupled to a first input (e.g., first positive input) of the combiner 414, an output of the ADC 402B is operatively coupled to an input of the FFEo 404B, an output of the FFEo 404B is operatively coupled to a second input (e.g., second positive input) of the combiner 414, and an output of the combiner 414 is operatively coupled to a first input (e.g., positive input) of the combiner 406. For some embodiments, the ADC 402A and FFEe 404A form a first (even) data path through the FSE 420, the ADC 402B and FFEo 404B form a second (odd) data path through the FSE 420, and the combiner 414 combines the even and the odd outputs of the first and the second data paths.

The ADC 402A is configured to generate a first digital signal based on the input analog signal and a first clock signal (CLK), and the ADC 402B is configured to generate a second digital signal based on the input analog signal and a second clock signal, where the second clock signal being out of phase with the first clock signal. For example, the first and the second clock signals are 180 degrees out of phase. Based on the first and the second clock signals, the combination of the ADC 402A and the ADC 402B can sample the input analog signal at twice the rate of the ADC 402 or the ADC 402B alone. For some embodiments, each of the ADC 402A and the ADC 402B is configured to sample the input analog signal at a baud rate.

The FFEe 404A receives the first digital signal from the ADC 402A and generates a first equalized signal based on the first digital signal, and the FFEo 404B receives the second digital signal from the ADC 402B and generates a second equalized signal based on the second digital signal. For some embodiments, the FSE 420 generates (e.g., creates) a notch in the digital signal at a frequency corresponding to the EMI to be cancelled, and the first equalized signal represents the digital signal with the notch. Unlike a conventional baud-rate equalization system, which can generate a notch only at frequencies below Nyquist (e.g., half of baud-rate), the FSE 420 of some embodiments can advantageously generate a notch at frequencies higher than Nyquist frequency. Additionally, for some embodiments, the FSE 420 helps in mitigating error propagation in the DFE 410.

The combiner 406 receives the first equalized digital from the FSE 420 (via the combiner 414), receives the second equalized signal from the DFE 410, and combines the first equalized signal and the second equalized signal to generate a narrowband-cancelled signal. For some embodiments, the combiner 406 combines the first and the second equalized signals by canceling, removing, or subtracting the second equalized signal from the first equalized signal. For various embodiments, the narrowband-cancelled signal represents the digital signal after electro-magnetic interference cancellation.

Figure 5:
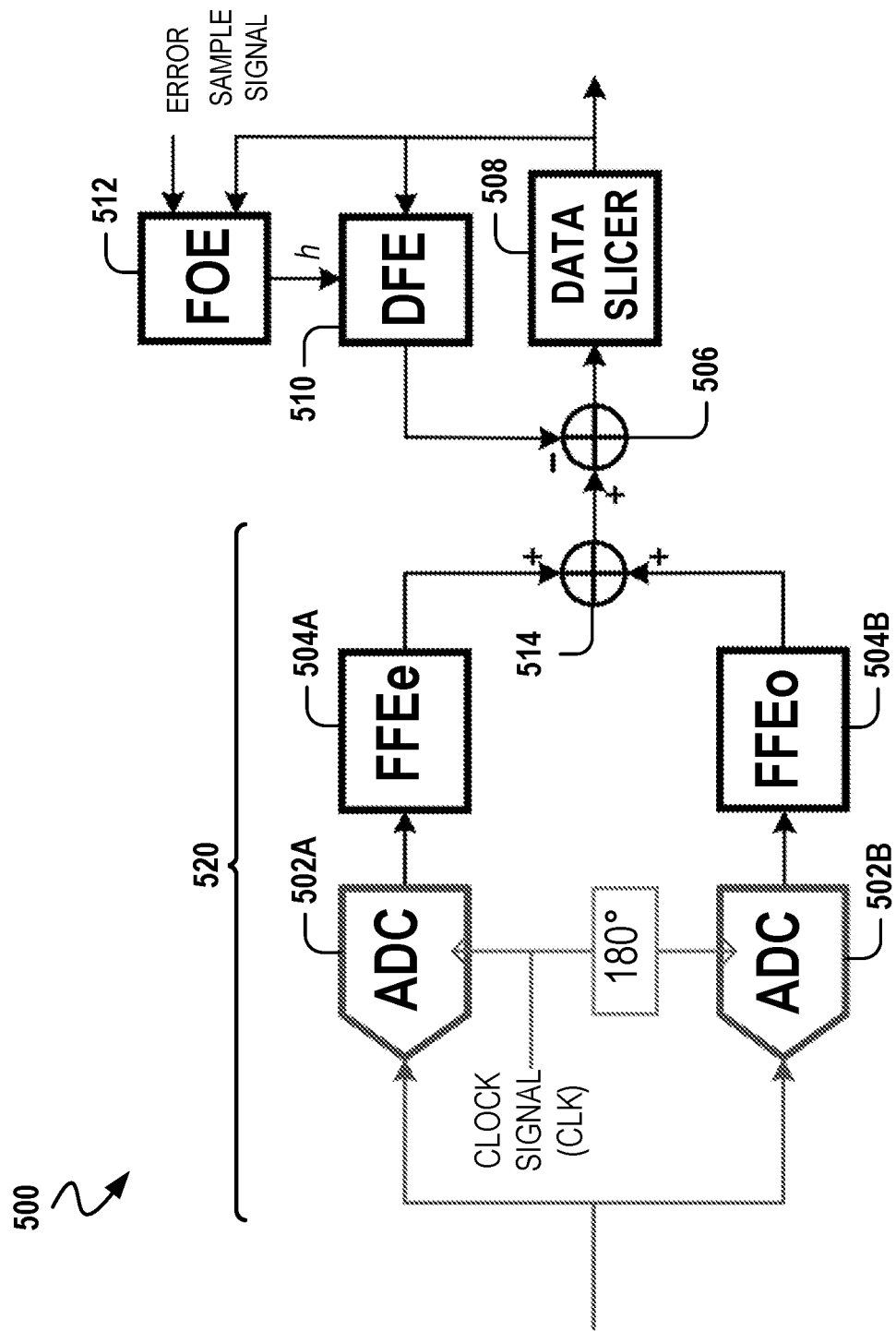

Referring now to FIG. 5, an example architecture 500 for a decision feedback equalizer (DFE) 510 with a fractionally-spaced equalizer (FSE) 520 and a filter optimization engine (FOE) 512 is illustrated. As shown, the architecture 500 comprises the FSE 520, a combiner 506, a data slicer 508, the DFE 510, and the FOE 512. According to some embodiments, the combiner 506, the data slicer 508, the DFE 510, and the FSE 520 (and its components 502A, 502B, 504A, 504B, 514) are respectively similar to the combiner 406, the data slicer 408, the DFE 410, and the FSE 420 (and its components 402A, 402B, 404A, 404B, 414) illustrated and described with respect to FIG. 4, and the FOE 512 is similar to the FOE 312 illustrated and described with respect to FIG. 3.

Figure 6:
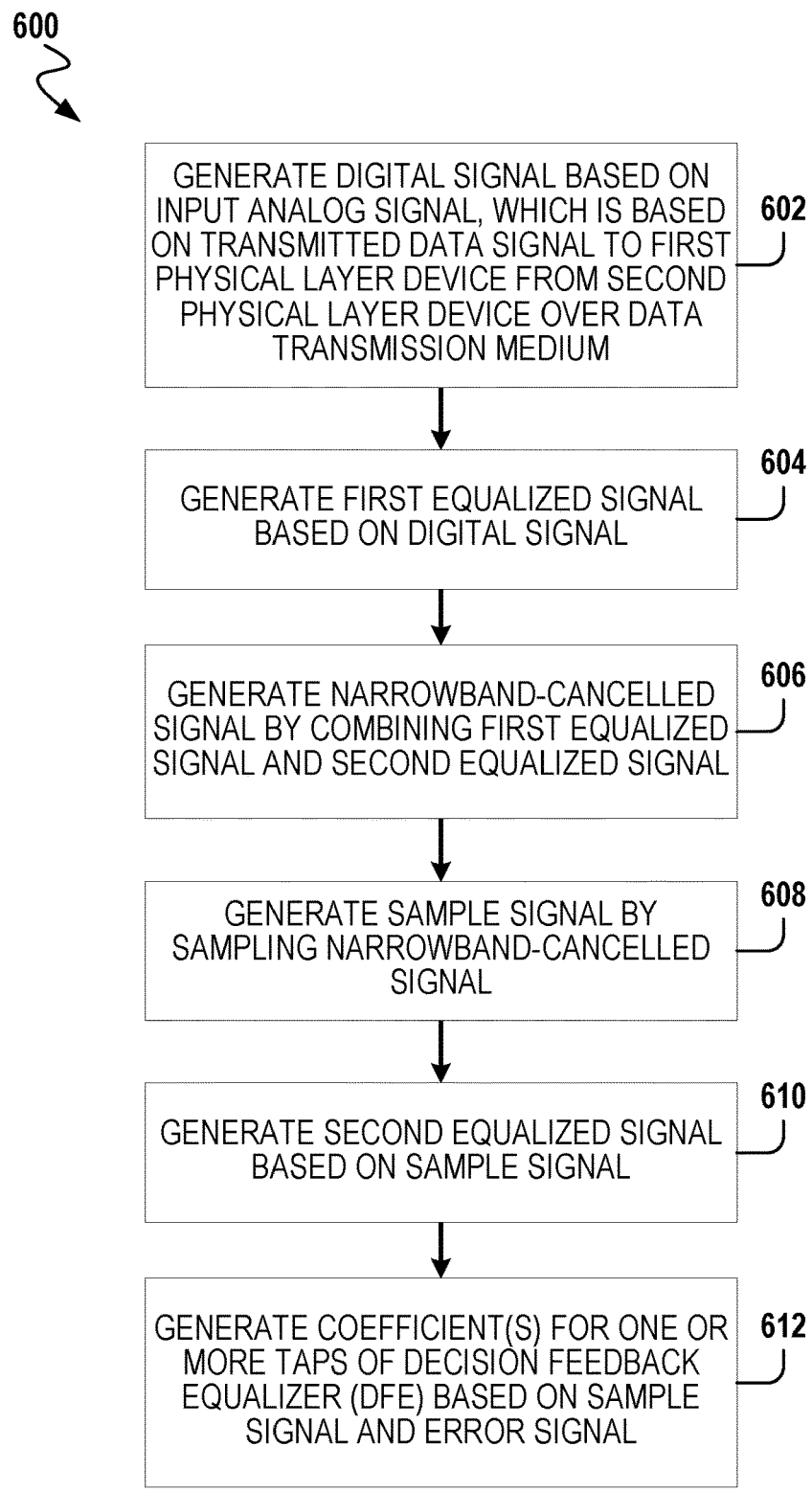
FIG. 6 is a flowchart illustrating an example method for using a decision feedback equalizer for EMI cancellation, in accordance with some embodiments.

FIG. 6 is a flowchart illustrating an example method 600 for using a decision feedback equalizer for EMI cancellation, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the method 600 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 6, the method 600 can be performed by the architecture 200 of FIG. 2 or the architecture 300 of FIG. 3, which can represent the architecture of a second physical layer device (e.g., 122). At operation 602, a digital signal is generated based on an input analog signal, where the input analog signal is based on a data signal transmitted from a second physical layer device (e.g., 112) to the first physical layer device over a data communication medium (e.g., 106). For some embodiments, operation 602 is performed by an analog-to-digital converter (ADC) (e.g., 202, 302) of the first physical layer device generates the digital signal based on the input analog signal. At operation 604, a first equalized signal is generated based on the digital signal. For some embodiments, operation 604 is performed by a feed-forward equalizer (FFE) (e.g., 204, 304) of the first physical layer device. Alternatively, for some embodiments, operations 602 and 604 are performed by a fractionally-spaced equalizer (FSE) (e.g., 420, 520) of the first physical layer device, which generates the first equalized signal based on the input analog signal.

During operation 606, a combiner (e.g., 206, 306, 406, 506) of the first physical layer device generates a narrowband-cancelled signal by combining the first equalized signal (generated via operation 604) and a second equalized signal, where the narrowband-cancelled signal represents the digital signal after electro-magnetic interference cancellation. At operation 608, a data slicer (e.g., 208, 308, 408, 508) of the first physical layer device generates a sample signal by sampling the narrowband-cancelled signal generated by operation 606. At operation 610, a decision feedback equalizer (DFE) (e.g., 210, 310, 410, 510) of the first physical layer device generates the second equalized signal (used by operation 606) based on the sample signal generated by operation 608. Additionally, at operation 612, a filter optimization engine (FOE) (e.g., 312, 512) or some other type of adaptor generates one or more coefficients for one or more corresponding taps of the DFE (e.g., 210, 310, 410, 510) based on the sample signal (generated by operation 610) and an error signal.

FIG. 7 is a block diagram illustrating components of an example machine 700 that can use one or more embodiments discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform one or more operations that may make use of one or more of the methodologies discussed herein. For example, the instructions 702 include executable code that causes the machine 700 to execute one or more operations that cause a physical (PHY) layer device of the machine 700 (e.g., embodied by communication components 722) to perform the method 600. The machine 700 may be coupled (e.g., networked) to other machines. Depending on the embodiment, the machine 700 can implement at least some portion of the first device 102 or the second device 104.

By way of non-limiting example, the machine 700 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702.

The machine 700 may include processors 704, memory 706, a storage unit 708, and I/O components 710, which may be configured to communicate with each other such as via a bus 712. In some embodiments, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform one or more operations that makes use of one or more of the methodologies described herein (e.g., the method 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices. According to various embodiments, the communication components 722 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A physical layer device comprising:
   a fractionally-spaced equalizer configured to generate a first equalized signal based on an input analog signal, the physical layer device being a first physical layer device, the input analog signal being based on a data signal transmitted from a second physical layer device to the first physical layer device over a data communication medium, the fractionally-spaced equalizer comprising:
   a first analog-to-digital converter configured to generate a first digital signal based on the input analog signal and a first clock signal;
   a first feed-forward equalizer configured to generate a second equalized signal based on the first digital signal;
   a second analog-to-digital converter configured to generate a second digital signal based on the input analog signal and a second clock signal, the second clock signal being out of phase with the first clock signal;
   a second feed-forward equalizer configured to generate a third equalized signal based on the second digital signal; and
   a first combiner configured to generate the first equalized signal by combining the second equalized signal and the third equalized signal;
   a second combiner configured to generate a narrowband-cancelled signal by combining the first equalized signal and a fourth equalized signal, the narrowband-cancelled signal representing the first digital signal after electro-magnetic interference cancellation;
   a data slicer configured to generate a sample signal by sampling the narrowband-cancelled signal; and
   a decision feedback equalizer configured to generate the fourth equalized signal based on the sample signal.

2. The physical layer device of claim 1, wherein the first clock signal and the second clock signal are out of phase by 180 degrees.

3. The physical layer device of claim 1, wherein the data slicer samples the narrowband-cancelled signal based on a pulse amplitude modulation (PAM).

4. The physical layer device of claim 1, further comprising:
a filter optimization engine configured to generate a set of coefficients for a corresponding set of taps of the decision feedback equalizer based on the sample signal and an error signal.

5. The physical layer device of claim 1, wherein the data slicer comprises a saturating data slicer.

6. The physical layer device of claim 5, wherein the saturating data slicer is a PAM-4 saturating data slicer.

7. The physical layer device of claim 1, wherein the data slicer comprises a wrapping data slicer.

8. The physical layer device of claim 7, wherein the second physical layer device implements Tomlinson-Harashima Precoding.

9. The physical layer device of claim 7, wherein the wrapping data slicer is a PAM-7 wrapping data slicer.

10. A method comprising:
generating, by a fractionally-spaced equalizer of a first physical layer device, a first equalized signal based on an input analog signal, the input analog signal being based on a data signal transmitted from a second physical layer device to the first physical layer device over a data communication medium, the fractionally-spaced equalizer comprising:
a first analog-to-digital converter configured to generate a first digital signal based on the input analog signal and a first clock signal;
a first feed-forward equalizer configured to generate a second equalized signal based on the first digital signal;
a second analog-to-digital converter configured to generate a second digital signal based on the input analog signal and a second clock signal, the second clock signal being out of phase with the first clock signal;
a second feed-forward equalizer configured to generate a third equalized signal based on the second digital signal; and
a first combiner configured to generate the first equalized signal by combining the second equalized signal and the third equalized signal;
generating, by a second combiner of the first physical layer device, a narrowband-cancelled signal by combining the first equalized signal and a fourth equalized signal, the narrowband-cancelled signal representing the first digital signal after electro-magnetic interference cancellation;
generating, by a data slicer of the first physical layer device, a sample signal by sampling the narrowband-cancelled signal; and
generating, by a decision feedback equalizer of the first physical layer device, the fourth equalized signal based on the sample signal.

11. The method of claim 10, wherein the first clock signal and the second clock signal are out of phase by 180 degrees.

12. The method of claim 10, wherein the narrowband-cancelled signal is sampled based on a pulse amplitude modulation (PAM).

13. The method of claim 10, further comprising:
generating, by a filter optimization engine of the first physical layer device, a set of coefficients for a corresponding set of taps of the decision feedback equalizer based on the sample signal and an error signal.

14. The method of claim 10, wherein the data slicer comprises a saturating data slicer.

15. The method of claim 14, wherein the saturating data slicer is a PAM-4 saturating data slicer.

16. The method of claim 10, wherein the data slicer comprises a wrapping data slicer.

17. The method of claim 16, wherein the second physical layer device implements Tomlinson-Harashima Precoding.

18. The method of claim 16, wherein the wrapping data slicer is a PAM-7 wrapping data slicer.

* * * * *